United States Patent
Otukol (10) Patent No.: US 7,608,171 B2
(45) Date of Patent: Oct. 27, 2009

(54) DISTILLATION SYSTEM AND PROCESS

(76) Inventor: Samuel Okwaja Otukol, 4417 Tyndall Avenue, Victoria, British Columbia (CA) V8N 3S3

(*) Notice: Subject to any disclaimer, the term of this patent is extended or adjusted under 35 U.S.C. 154(b) by 647 days.

(21) Appl. No.: 11/273,318

(22) Filed: Nov. 14, 2005

(65) Prior Publication Data
US 2007/0108037 A1 May 17, 2007

(51) Int. Cl.
*B01D 3/02* (2006.01)
*B01D 3/14* (2006.01)
*C02F 1/14* (2006.01)

(52) U.S. Cl. .......................... 203/10; 202/155; 202/172; 202/184; 202/186; 202/234; 202/267.1; 203/86; 203/87; 203/DIG. 1; 203/DIG. 17

(58) Field of Classification Search ................. 159/901, 159/903, DIG. 15; 202/155, 172, 184, 186, 202/234, 267.1; 203/10, 41, 84, 86, 87, 98, 203/DIG. 1, DIG. 17

See application file for complete search history.

(56) References Cited

U.S. PATENT DOCUMENTS

| | | | |
|---|---|---|---|
| 2,490,659 A | 12/1949 | Snyder | |
| 3,856,631 A | 12/1974 | Smith, Jr. | |
| 3,875,926 A * | 4/1975 | Frank | 126/635 |
| 4,091,622 A * | 5/1978 | Marchesi | 60/641.15 |
| 4,184,477 A * | 1/1980 | Yuan | 126/620 |
| 4,373,996 A | 2/1983 | Maruko | |
| 4,421,606 A * | 12/1983 | Tsumura et al. | 203/10 |
| 4,459,177 A * | 7/1984 | O'Hare | 203/10 |
| 4,525,242 A | 6/1985 | Iida | |
| 4,822,455 A | 4/1989 | Olrik | |
| 4,953,694 A * | 9/1990 | Hayashi et al. | 202/180 |
| 4,957,200 A * | 9/1990 | Turner et al. | 202/181 |
| 5,181,991 A | 1/1993 | Deutsch | |
| 5,316,626 A * | 5/1994 | Guy | 203/10 |
| 5,628,879 A * | 5/1997 | Woodruff | 202/234 |
| 5,728,303 A | 3/1998 | Johnson | |
| 6,158,239 A | 12/2000 | Max et al. | |
| 6,165,326 A | 12/2000 | Markopulos | |
| 7,258,767 B2 * | 8/2007 | Ter Beek et al. | 203/10 |

FOREIGN PATENT DOCUMENTS

| | | |
|---|---|---|
| CA | 2446829 | 4/2004 |
| GB | 2330779 | 5/1999 |

* cited by examiner

*Primary Examiner*—Virginia Manoharan
(74) *Attorney, Agent, or Firm*—Michael I. Kroll (57) ABSTRACT

A distillation system for distilling contaminated water includes an evaporation chamber for receiving the contaminated water. The evaporation chamber includes (i) a vessel for absorbing the contaminated water; (ii) a plurality of heat conductive pipes extending through the vessel for delivering the contaminated water to the vessel; and (iii) a heat source for heating the plurality of heat conductive pipes for evaporating the contaminated water absorbed by the vessel and causing the at least one contaminant to be retained by the vessel. A condensation chamber is connected to the evaporation chamber for receiving the evaporated water for condensing and producing purified water in liquid form. A storage device is connected to the condensation chamber for storing the purified liquid water.

12 Claims, 10 Drawing Sheets

S200 — THE EVAPORATION CHAMBER, THE AIR PUMP, THE CONDENSATION CHAMBER AND THE RETURN AIR PIPES ARE CONNECTED IN A CLOSED AIR SYSTEM WHERE INTRODUCTION OF FRESH AIR IS CONTROLLED.

S202 — THE EVAPORATION FROM THE CERAMIC VESSEL SURFACE IS CONTINUOUS, SO THAT THE HUMIDITY BUILDS UP UNTIL PRECIPITATION OCCURS ON THE SURFACE OF THE COOLED WATER PIPES.

DISTILLATION SYSTEM AND PROCESS

BACKGROUND OF THE INVENTION

1. Field of the Invention

The present invention relates generally to water treatment and, more specifically, to a process for water desalination, or purifying contaminated water. The process involves salt or contaminated water being fed into ceramic vessels, which absorb the water. Warmth is provided thereby causing the water to evaporate and leaving salt crystals behind on the vessels. The evaporated air is filtered and then moved to a separate area where it is condensed into purified water. The purified water is stored in a tank until needed.

2. Description of the Prior Art

There are other filtering devices designed for treating water. Typical of these is U.S. Pat. No. 2,490,659 issued to Snyder on Dec. 6, 1949.

Another patent was issued to Smith, Jr. on Dec. 24, 1974 as U.S. Pat. No. 3,856,631. Yet another U.S. Pat. No. 4,373,996 was issued to Maruko on Feb. 15, 1983 and still yet another was issued on Jun. 25, 1985 to Iida as U.S. Pat. No. 4,525,242.

Another patent was issued to Olrik on Apr. 18, 1989 as U.S. Pat. No. 4,822,455. Yet another U.S. Pat. No. 5,181,991 was issued to Deutsch on Jan. 26, 1993. Another was issued to Johnson on Mar. 17, 1998 as U.S. Pat. No. 5,728,303 and still yet another was issued on Dec. 12, 2000 to Max. et al. as U.S. Pat. No. 6,158,239.

Another patent was issued to Markopulos on Dec. 26, 2000 as U.S. Pat. No. 6,165,326. Yet another U.K. Patent No. GB2330779 was issued to Filewood on May 5, 1999. Another was issued to Gadassi on Apr. 25, 2004 as Canadian Patent No. CA 2446829.

U.S. Pat. No. 2,490,659

Inventor: Robert E. Snyder

Issued: Dec. 6, 1949

In apparatus for distilling water under reduced pressure: a water boiler; a condenser to condense water evaporated from said boiler; means for maintaining a predetermined pressure within said boiler below that of the outside air; means for adding and for removing elements of the distillation process to and from the still during its continuous operation within the established operating pressure range said means including a boiler flushing means comprising an overflow reservoir, a barometric column between said reservoir and said boiler, and a fluid trap in said barometric column wherein a certain amount of heavy salt water may collect prior to periodic flushing; and a solar heat absorbing means connected to said boiler by a plurality of tubular members through which water circulates by convection from and to said boiler.

U.S. Pat. No. 3,856,631

Inventor: Calvin S. Smith, Jr.

Issued: Dec. 24, 1974

Apparatus and method for distilling aqueous solutions, especially saline water, for the purpose of producing fresh water, wherein a heat transfer medium in the form of a lower boiling immiscible liquid is employed in a manner to give up its latent heat of condensation directly to the solution and the resulting condensate is re-evaporated by heat from the resulting fresh water; such apparatus and method providing certain advantages such as ability to work with a small heat differential between the temperature of the source of external heat and the temperature of the heat sink.

U.S. Pat. No. 4,373,996

Inventor: Saburo Maruko

Issued: Feb. 15, 1983

An apparatus for producing fresh water from sea water in which a vertical accumulator utilizes the sensible heat of sea water so as to evaporate said sea water to a temperature above 100 DEG C. under pressure, a heat-exchanger connecting between the upper and lower portions of said accumulator causes a high temperature liquid to effect heat-exchange with sea water to be evaporated, a fresh sea water feed line connected to the lower portion of said accumulator adjusts the pressure within the accumulator and an evaporator receives higher temperature sea water. The accumulator accumulates heat in such a manner that the upper portion of said accumulator holds higher temperature sea water and the lower portion of the accumulator holds lower temperature sea water so that when heat is accumulated, the amount of said higher temperature sea water increases and when heat is radiated, the amount of higher temperature decreases whereby sea water evaporates at all times.

U.S. Pat. No. 4,525,242

Inventor: Tomimaru Iida

Issued: Jun. 25, 1985

A heat-transfer medium is heated by a solar heat collector and then adiabatically compressed. The heat-transfer medium thus compressed exchanges heat with the seawater to heat it, and is then adiabatically expanded with the heated seawater being evaporated and the steam thus produced, upon heat exchange with the seawater, changed into fresh water.

U.S. Pat. No. 4,822,455

Inventor: Henrik-Gemer Olrik

Issued: Apr. 18, 1989

A distilling and desalination apparatus comprising an evaporation chamber and a condensing chamber in which the evaporation chamber through a cooling circuit communicates by way of heat exchange with the condensing chamber and rotates in relation thereto. The evaporation chamber is constructed to form a thin fluid film on the inner surface of the evaporation chamber during rotation, surplus water being slung out along the edge and into channels and led tangentially to the rear by blades. The cooling circuit comprises a condensing portion and an evaporation portion, the fluid being evaporated along the inner surface of the coolant condensing portion, and fluid vapors being condensed along the outer surface of the coolant condensing portion, whereupon the drops of fluid are slung outwards and collected.

U.S. Pat. No. 5,181,991

Inventor: David Deutsch

Issued: Jan. 26, 1993

The disclosure relates to an improved solar water purification apparatus. More specifically, it relates to a solar water purification apparatus that includes a first and second preheater, an evaporation load tank, condenser, and pure distillate collecting tank. The condensing surface is a domed upper structure which includes a corrugated inner surface to increase the condensing surface. The outersurface of the domed upper structure is likewise corrugated and completely enclosed by a first preheater chamber that permits efficient cooling of the domed upper structure and encourage rapid condensation, thus transferring heat from the interior corrugations to the exterior corrugations of the first preheater chamber, further adding to the overall thermal efficiency. After the load, which is any form of polluted water including seawater, is preheated in the first preheater chamber, it is directed to the an external solar operated preheater from which it is directed into the load evaporation tank within the domed upper structure where it evaporates and condenses on the internal corrugated surface of the domed upper structure and flows by gravity into a distillate collecting tank which is inverted mirror image of the domed upper structure. Back-up electrical heater units are provided for periods of cloudy days.

U.S. Pat. No. 5,728,303

Inventor: Dennis E. J. Johnson

Issued: Mar. 17, 1998

An improved electro-coalescent/magnetic separation (ECMS) system for removing contaminants from water, including desalinization, comprises a device for exposing a stream of water to be treated to an electric field, followed by introduction of ionized coagulating substances, including ionized gases and/or metal ions, followed by plural filter stages. The first filter stage may comprise a polarizable glass, alumina, or ceramic media provided as a bed in a tank with an underdrain, so as to provide substantial residence time. A polishing filter may comprise a very fine fiber or organic gel filter element confined between relatively flexible electrically-conductive screen members and provided with a DC power supply to polarize the filter. This assembly is confined between relatively rigid, perforated members such that the filter assembly can move slightly upon backwash to dislodge caked-on contaminants or the like, while preserving the structural integrity of the filter assembly.

U.S. Pat. No. 6,158,239

Inventor: Michael D. Max.

Issued: Dec. 12, 2000

In one embodiment, this invention pertains to desalination of seawater by feeding methane into seawater at a depth generally exceeding 100 meters to form methane hydrate which rises to where it is decomposed into methane and water, and recovering water. Methane is recycled to depth to form more buoyant hydrate.

U.S. Pat. No. 6,165,326

Inventor: Johannes Markopulos

Issued: Dec. 26, 2000

A facility for the desalination and purification of sea water or brackish water by solar energy provided with a closed cycle including a thermal solar collector and a heat exchanger in which a heat transfer medium is circulating, and a basin for receiving the sea water or brackish water with the heat exchanger being placed in the basin for heating and evaporating water. A cooling surface is disposed above the basing for condensing the evaporated water which is then diverted to water collectors. The solar collector is located above the cooling surface so as to keep it in the shade.

U.K. Patent Number GB 2330779

Inventor: Alan Roy Filewood

Issued: May 5, 1999

A process for the desalination of salt-containing water (16), comprises feeding a web (26) of water-absorbent material through a body (12) of brackish water (16) into an air space (28) above said body (12) of water. A stream of air (52) is directed over said web (26) in said air space (28) to evaporate water therefrom. Thereafter said web (26) is returned to said body (12) of water. The water-containing air stream (52) is directed to a condensation space (42) where desalinated water is condensed therefrom.

Canadian Patent Number CA2446829

Inventor: Haim Gadassi

Issued: Apr. 25, 2004

Many areas in the world already suffer shortages of water, and others will suffer from it in the coming years. Therefore more efficient water sweetening is essential for our survival on this planet. The most commonly used water sweetening methods are: Reversed osmosis, distillation, electrodyalisis, and partial freezing. However, these methods suffer from low efficiency and high energy consumption, thus making them significantly more expensive than naturally obtained water. The present invention describes a system & method for efficient and low energy sweetening of water, based on borderline fast fluctuation between liquid to gaseous state and back, by using centrifugal forces to make water droplets fly at a high speed, so that they evaporate for a split second, the salt is separated, and they condense again. The present invention tries to make the process energy-efficient by enabling the use of lower speeds and smaller droplet sizes and solving various problems involved with that, while preferably using a parabolic plate with a preferably vertical axis of rotation. Other solutions covered are for example automatically collecting the salt particles into larger molecules, for example by the use of Chelating agents, so that the larger molecules can be removed for example by magnetic forces or with a larger-hole sieve that requires considerably less energy than reverse osmosis.

SUMMARY OF THE PRESENT INVENTION

The present invention relates generally to water treatment and, more specifically, to a process for water desalination, or purifying contaminated water. The process involves salt or contaminated water being fed into ceramic vessels, which absorb the water. Warmth is provided thereby causing the water to evaporate and leaving salt crystals behind on the vessels. The evaporated air is filtered and then moved to a separate area where it is condensed into purified water. The purified water is stored in a tank until needed.

A primary object of the present invention is to provide a desalination process that overcomes the shortcomings of the prior art.

Another secondary object of the present invention is to provide a desalination process that desalinizes water.

Still yet another object of the present invention is to provide a desalination process that includes an evaporation chamber.

Still another object of the present invention is to provide a desalination process that includes a leaching material.

Yet another object of the present invention is to provide a desalination process wherein baked clay is the leaching material.

Another object of the present invention is to provide a desalination process whereby the baked clay is located within the evaporation chamber.

Still yet another object of the present invention is to provide a desalination process whereby water evaporates from the exterior surface of the baked clay.

Another object of the present invention is to provide a desalination process whereby the water evaporates after an application of heated air.

Yet another object of the present invention is to provide a desalination process whereby the salt that remains on the clay after evaporation is periodically removed.

Still yet another object of the present invention is to provide a desalination process that includes a sensor.

Yet another object of the present invention is to provide a desalination process whereby the sensor controls the movement of the vapor laden air from the evaporation chamber to a condensation chamber.

Still another object of the present invention is to provide a desalination process wherein a plurality of condensation pipes is located in the condensation chamber.

Another object of the present invention is to provide a desalination process whereby the desalinated water is stored.

Yet still another object of the present invention is to provide a desalination process whereby solar energy is used to raise the air temperature and therefore water vapor levels in the evaporation chamber.

Another object of the present invention is to provide a desalination process whereby household heaters are used to raise the air temperature in the evaporation chamber.

Still another object of the present invention is to provide a desalination process that is simple and easy to use.

Another object of the present invention is to provide a desalination process that is inexpensive to manufacture and operate.

Additional objects of the present invention will appear as the description proceeds.

The present invention overcomes the shortcomings of the prior art by providing a process for water desalination, or purify contaminated water. The ceramic material absorbs the salt or contaminated water, working its way to the outer surface of the vessel. The ceramic vessel serves acts as a medium for moving contaminated or salt water to a surface where it is then evaporated. The ceramic vessel also acts as a means for absorbing heat that evaporates the water. The ceramic vessel also acts as a rigid structure, which forms surface area for water evaporation and salt crystalization. Also because the amount of water evaporated depends on the surface area available, the ceramic vessels are a cheap means for expanding evaporation surface area without increasing operating costs unnecessarily. The evaporated water is extracted from the evaporation chamber by a ventilation pump and is blown into a cooling chamber containing a system of water or fluid cooled pipes. The water (or fluid) flowing through the pipes is cooled to a temperature of 10 degrees centigrade. The evaporated water is blown over the cooled pipes. This causes the water vapor to condense and precipitate as water. The precipitated water is collected and channeled into a storage tank.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the Figures illustrate the desalination process of the present invention. With regard to the reference numerals used, the following numbering is used throughout the various drawing Figures.

10 Desalination process of the present invention
12 cold water tank
14 salt water tank
16 fresh water tank 18 condensation chamber
20 condensation surface pipes
22 return duct
24 ventilation pump
26 evaporation chamber
28 windows
30 copper tubing
32 vessel
34 filter
36 panels
38 salt water
40 evaporated water
42 inflow directional arrow
44 outflow directional arrow
46 fresh water pipe
48 first salt water pipe
50 second salt water pipe
52 salt water tank top
54 salt water tank bottom
56 salt water tank side
58 fresh water
60 air extraction pump
62 first end salt water pipe
64 second end salt water pipe
66 first exposed end of tubing
68 second embedded end of tubing
70 first connection point on second salt water pipe
72 second connection point on second salt water pipe
74 condensation structure
76 cold water inflow pipe
78 cold water outflow pipe

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments. Practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 10 illustrate a desalination process of the present invention which is indicated generally by the reference numeral 10.

Figure 1:
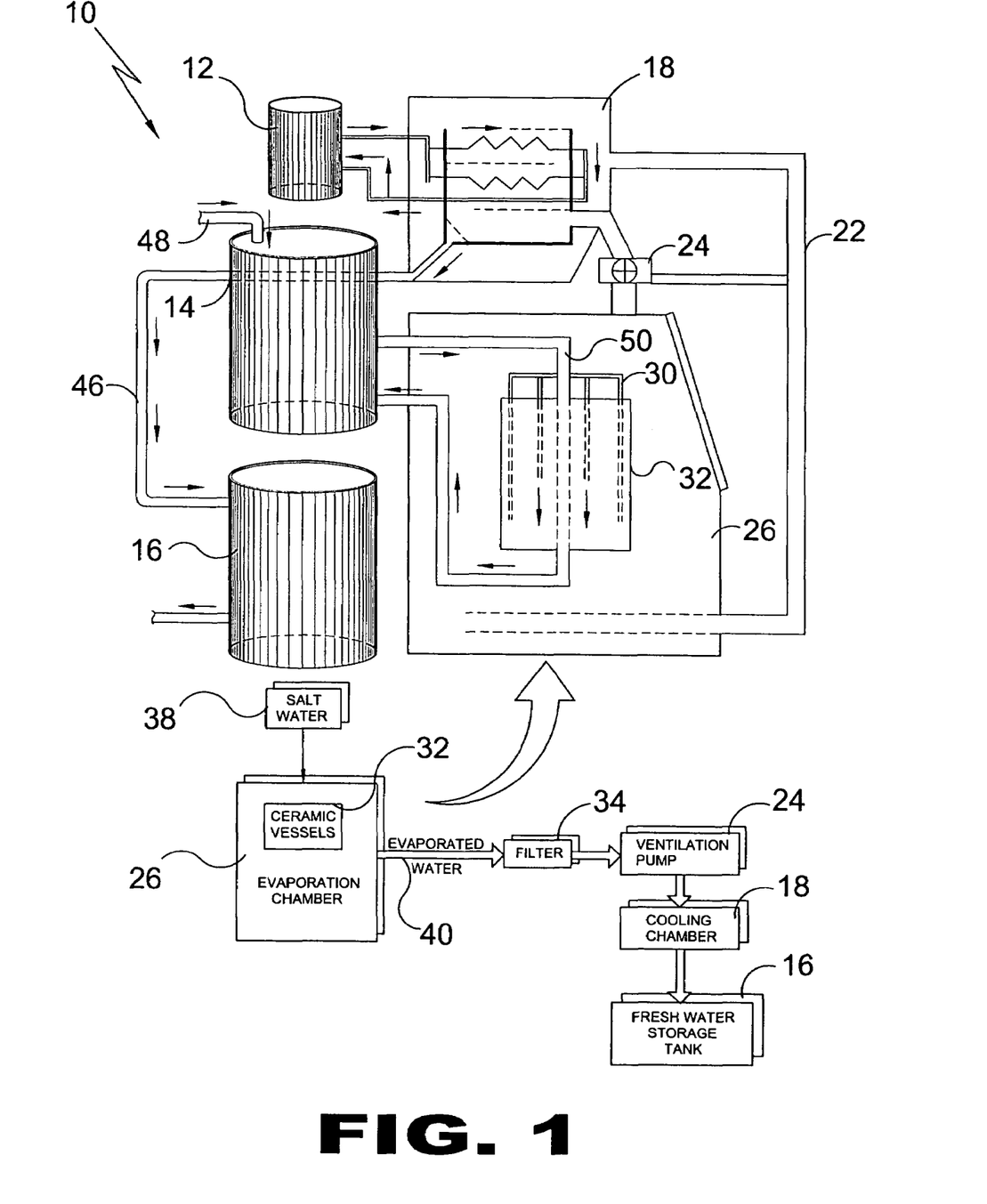
FIG. 1 is an illustrative view of the desalination process of the present invention.

FIG. 1 is an illustrative view of the desalination process 10 of the present invention. The desalination process 10 includes a salt water tank 14. Salt water 38 flows through a first salt water pipe 48 into the salt water tank 14. However, this is shown for purposes of example only, and the water in the tank 14 can also be contaminated water. A second salt water pipe 50 connects the salt water tank 14 to a vessel 32. The vessel 32, shown herein, is made from ceramics or clay. However, the vessel 32 can be made from any material that absorbs water. The vessel 32 is located within an evaporation chamber 26. The salt water 38 flows from the salt water tank 14 through the second salt water pipe 50 and into the vessel 32, via a plurality of tubing 30 which will be discussed hereinafter with specific reference to FIG. 2. The vessel 32 absorbs the salt water 38 until the vessel 32 is saturated. The evaporation chamber 26 transforms the salt water 38 into evaporated water 40 and salt crystals. The salt crystals remain on the surface of the vessel 32 until removed.

The evaporated water 40 is removed from the evaporation chamber 26 by a ventilation pump 24. The ventilation pump 24 moves the evaporated water 40 from the evaporation chamber 26 to a condensation chamber 18. As the evaporated water 40 leaves the evaporation chamber 26, it passes through a filter 34, not shown. The filter 34 removes dust or gaseous byproducts of the evaporation process.

The condensation chamber 18 cools the evaporated water 40 until it condenses and precipitates into fresh water 58. A fresh water pipe 46 connects the condensation chamber 18 to a fresh water tank 16. The fresh water 58 flows through the fresh water pipe 46 and into the fresh water tank 16. The fresh water 58 is stored in the fresh water tank 16 until needed.

The evaporated water 40 that remains in the condensation chamber 18 because it has not been condensed is extracted therefrom by an air extraction pump 60, not shown. A return duct connects the air extraction pump 60 to the evaporation chamber 26. The air extraction pump 60 pumps the non-condensed evaporated water 40 through the return duct 22 and into the evaporation chamber 26.

Figure 2:
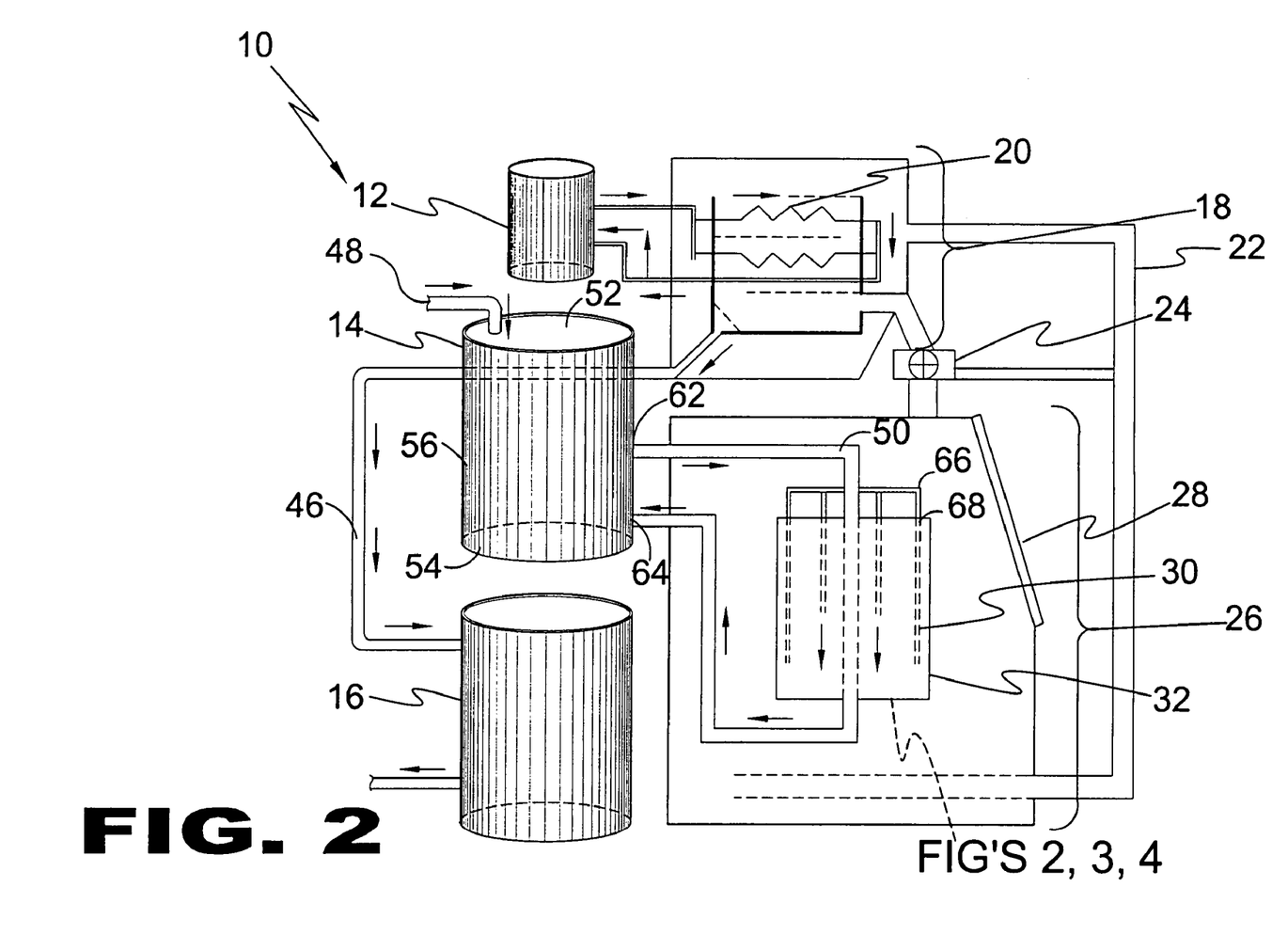
FIG. 2 is an illustrative view of the desalination process of the present invention.

FIG. 2 is an illustrative view of the desalination process 10 of the present invention. The desalination process 10 includes the salt water tank 14. The salt water tank 14 includes a top 52, a bottom 54 and a side 56. Shown herein, the salt water tank 14 is cylindrically shaped. However, this is for purposes of example only, and the salt water tank 14 can be of any geometric shape. The first salt water pipe 48 is connected to the top 52 of the salt water tank 14. Salt water 38 flows through the first salt water pipe 48 into the salt water tank 14. However, this is shown for purposes of example only, and the water in the tank 14 can also be contaminated water.

The second salt water pipe 50 has a first end 62 and a second end 64. The first end 62 of the second salt water pipe 50 is connected to the side 56 of the salt water tank 14. The salt water pipe 50 then passes through the evaporation chamber 26 and through the vessel 32. The second end 64 of the second salt water pipe 50 is connected to the side 56 of the salt water tank 14 at a location different from where the first end 62 of the second salt water pipe 50 is connected. As indicated by the directional arrows, the salt water 38 flows from the salt water tank 14 into the first end 62 of the second salt water pipe 50, through the second salt water pipe 50 and out of the second end 64 of the second salt water pipe 50 to be returned to the salt water tank 14.

The plurality of tubes 30 are integrally connected at a first exposed end 66 to the second salt water pipe 50 between the first end 62 and the vessel 32. Shown herein the tubing 30 is made of copper. However, the tubing 30 can be made of any material that is a good conductor of heat. The tubing 30 has a second end 68 embedded within the vessel 32. The tubing 30 contains a plurality of perforations, not shown, along their length. The vessel 32, shown herein, is made from ceramics or clay. However, the vessel 32 can be made form any material that absorbs water. A quantity of salt water 38 passes from the second salt water pipe 50 through the tubes 30. The salt water 38 passes through the perforations in the tubes 30 to saturate the vessel 32.

Shown herein the evaporation chamber 26 includes a window 28 to heat the evaporation chamber 26 by solar power. However, this is for purposes of example only, and the evaporation chamber 26 can be heated by other means. The tubing 30 and the vessel 32 are heated by the solar power, which in turn warms the salt water 38. When the salt water 38 is heated to a particular temperature, the salt water 38 evaporates from the vessel 32 leaving salt crystals on the surface of the vessel 32 and becoming evaporated water 40.

The evaporated water 40 is removed from the evaporation chamber 26 by the ventilation pump 24. The ventilation pump 24 moves the evaporated water 40 from the evaporation chamber 26 to the condensation chamber 18. As the evaporated water 40 leaves the evaporation chamber 26, it passes through the filter 34, not shown. The filter 34 removes dust or gaseous byproducts of the evaporation process.

The condensation chamber 18 houses a plurality of condensation surface pipes 20. Water or a fluid flows through the condensation surface pipes 20. The water or fluid is kept at a temperature of approximately 10° C. As the evaporated water 40 passes over the cooled condensation surface pipes 20, the evaporated water 40 condenses and precipitates as fresh water 58. The fresh water 58 passes through a fresh water pipe 46 which connects the condensation chamber 18 to a fresh water tank 16. The fresh water 58 is stored in the fresh water tank 16 until needed.

The portion of evaporated water 40 that has not condensed and thus remains in the condensation chamber 18 is extracted therefrom by the air extraction pump 60, not shown. The return duct connects the air extraction pump 60 to the evaporation chamber 26. The air extraction pump 60 pumps the non-condensed evaporated water 40 through the return duct 22 and into the evaporation chamber 26, where it is re-circulated.

Figure 3:
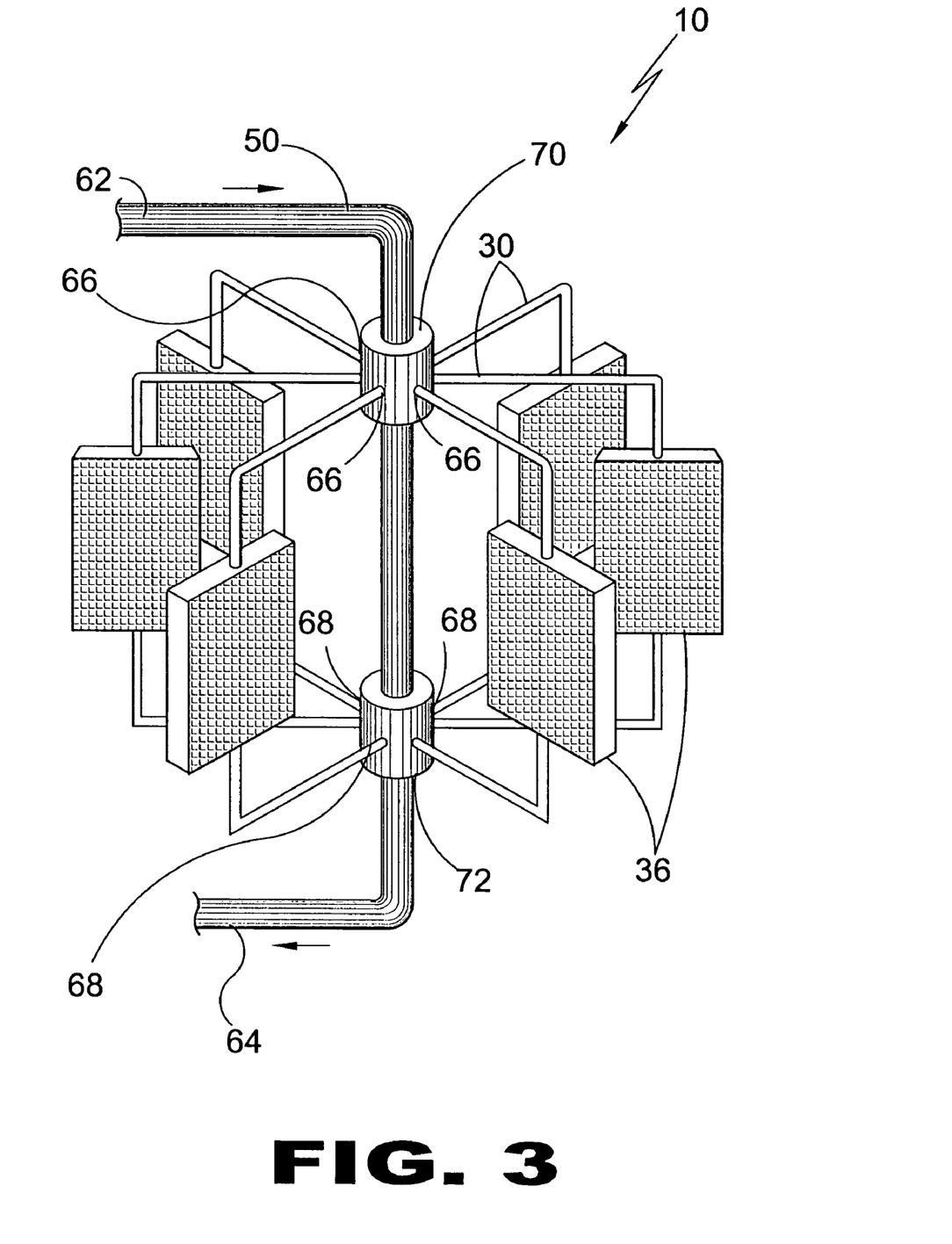
FIG. 3 is an additional vessel configuration of the desalination process of the present invention.

FIG. 3 is an alternate embodiment of the vessel 32 of the desalination process 10 of the present invention. The desalination process 10 includes the second salt water pipe 50 as described above with specific reference to FIG. 2. The salt water pipe 50 passes through the evaporation chamber 26 and through the vessel 32. The second end 64 of the second salt water pipe 50 is connected to the side 56 of the salt water tank 14 at a location different from where the first end 62 of the second salt water pipe 50 is connected. As indicated by the directional arrows, the salt water 38 flows through the first end 62 of the second salt water pipe 50, through the second salt water pipe 50 and out of the second end 64 of the second salt water pipe 50 to be returned to the salt water tank 14.

Shown herein, each tube 30 is shaped like a U-bracket. The first end 66 of the tube 30 is integrally connected to the second salt water pipe 50 at a first connection point 70. The second end 68 of the tube 30 is integrally connected to the second salt water pipe 50 at a second connection point 72. Shown herein the tubing 30 is made of copper. However, the tubing 30 can be made of any material that is a good conductor of heat. In the present embodiment, a plurality of panels 36 is used instead of the vessel 32 shown in FIG. 2. Shown herein, the panels 36 are rectangular in shape. However, any geometric shape may be used. The panels 36 shown herein are made from ceramics or clay. However, the panels 36 can be made form any material that absorbs water. Each tube 30 passes transversely through each panel 36. The tubing 30 contains a plurality of perforations, not shown, along their length. A quantity of salt water 38 passes from the second salt water pipe 50 through the tubes 30. The salt water 38 passes through the perforations in the tubes 30 to saturate the panels 36.

Figure 4:
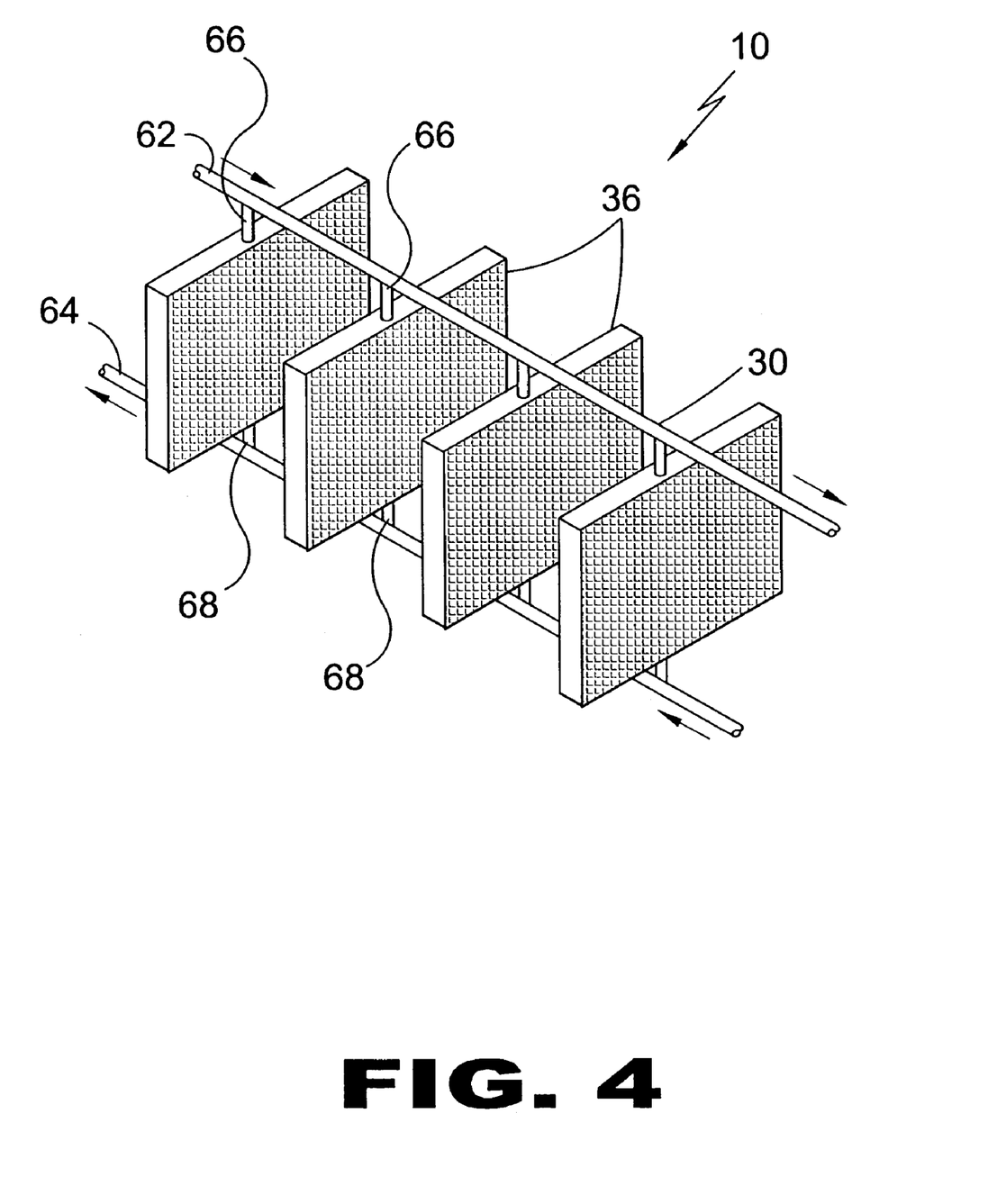
FIG. 4 is another additional vessel configuration of the desalination process of the present invention.

FIG. 4 is an alternate embodiment of the vessel 32 of the desalination process 10 of the present invention. The desalination process 10 includes the second salt water pipe 50 as described above with specific reference to FIG. 2. The salt water pipe 50 passes through the evaporation chamber 26. The second end 64 of the second salt water pipe 50 is connected to the side 56 of the salt water tank 14 at a location different from where the first end 62 of the second salt water pipe 50 is connected. As indicated by the directional arrows, the salt water 38 flows through the first end 62 of the second salt water pipe 50, through the second salt water pipe 50 and out of the second end 64 of the second salt water pipe 50 to be returned to the salt water tank 14.

Shown herein, the first end 66 of each tube 30 is integrally connected to the second salt water pipe 50 at a point on the pipe 50 where the salt water 38 is flowing from the first end 62. The second end 68 of each tube 30 is integrally connected to the second salt water pipe 50 at a point on the pipe 50 where the salt water 38 is being returned through the second end 64 to the salt water tank 14. Shown herein the tubing 30 is made of copper. However, the tubing 30 can be made of any material that is a good conductor of heat. In the present embodiment, the plurality of panels 36 is used instead of the vessel 32 shown in FIG. 2. Shown herein, the panels 36 are rectangular in shape. However, any geometric shape may be used. The panels 36 shown herein are made from ceramics or clay. However, the panels 36 can be made form any material that absorbs water. Each tube 30 passes transversely through each panel 36. The panels 36 are linearly aligned. The tubing 30 contains a plurality of perforations, not shown, along their length. A quantity of salt water 38 passes from the second salt water pipe 50 through the tubes 30. The salt water 38 passes through the perforations in the tubes 30 to saturate the panels 36.

Figure 5:
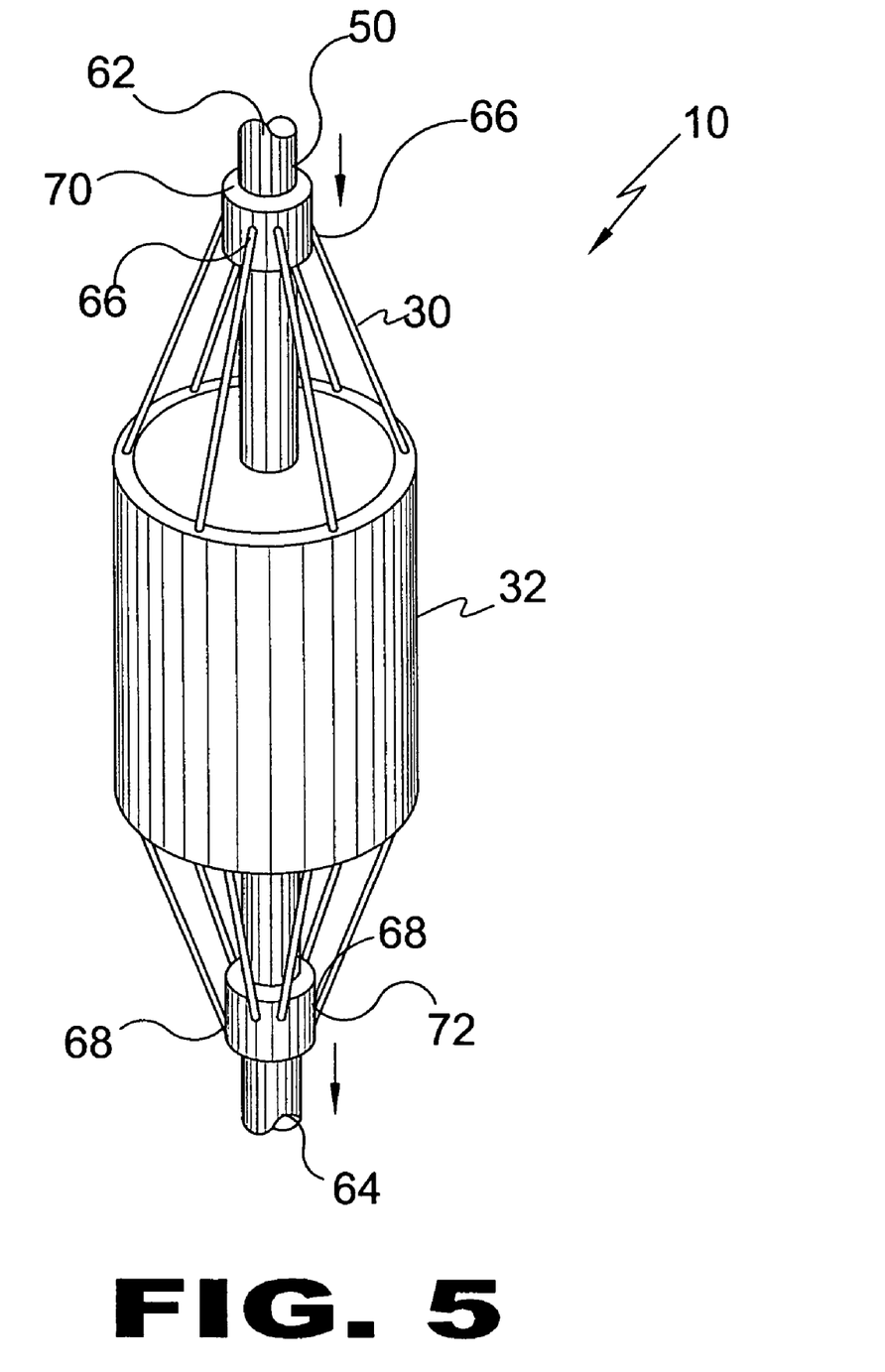
FIG. 5 is another additional vessel configuration of the desalination process of the present invention.

FIG. 5 is an alternate embodiment of the vessel 32 of the desalination process 10 of the present invention. The desalination process 10 includes the second salt water pipe 50 as described above with specific reference to FIG. 2. The salt water pipe 50 passes through the evaporation chamber 26 and through the vessel 32. The second end 64 of the second salt water pipe 50 is connected to the side 56 of the salt water tank 14 at a location different from where the first end 62 of the second salt water pipe 50 is connected. As indicated by the directional arrows, the salt water 38 flows through the first end 62 of the second salt water pipe 50, through the second salt water pipe 50 and out of the second end 64 of the second salt water pipe 50 to be returned to the salt water tank 14.

Shown herein, the first end 66 of each tube 30 is integrally connected to the second salt water pipe 50 at the first connection point 70. The second end 68 of each tube 30 is integrally connected to the second salt water pipe 50 at the second connection point 72. Shown herein the tubing 30 is made of copper. However, the tubing 30 can be made of any material that is a good conductor of heat. In the present embodiment, the vessel 32 is cylindrically shaped. However, any geometric shape may be used. The vessel 32 is made from ceramics or clay. However, the vessel 32 can be made form any material that absorbs water. Each tube 30 passes transversely through the vessel 32. The tubing 30 contains a plurality of perforations, not shown, along their length. A quantity of salt water 38 passes from the second salt water pipe 50 through the tubes 30. The salt water 38 passes through the perforations in the tubes 30 to saturate the vessel 32.

Figure 6:
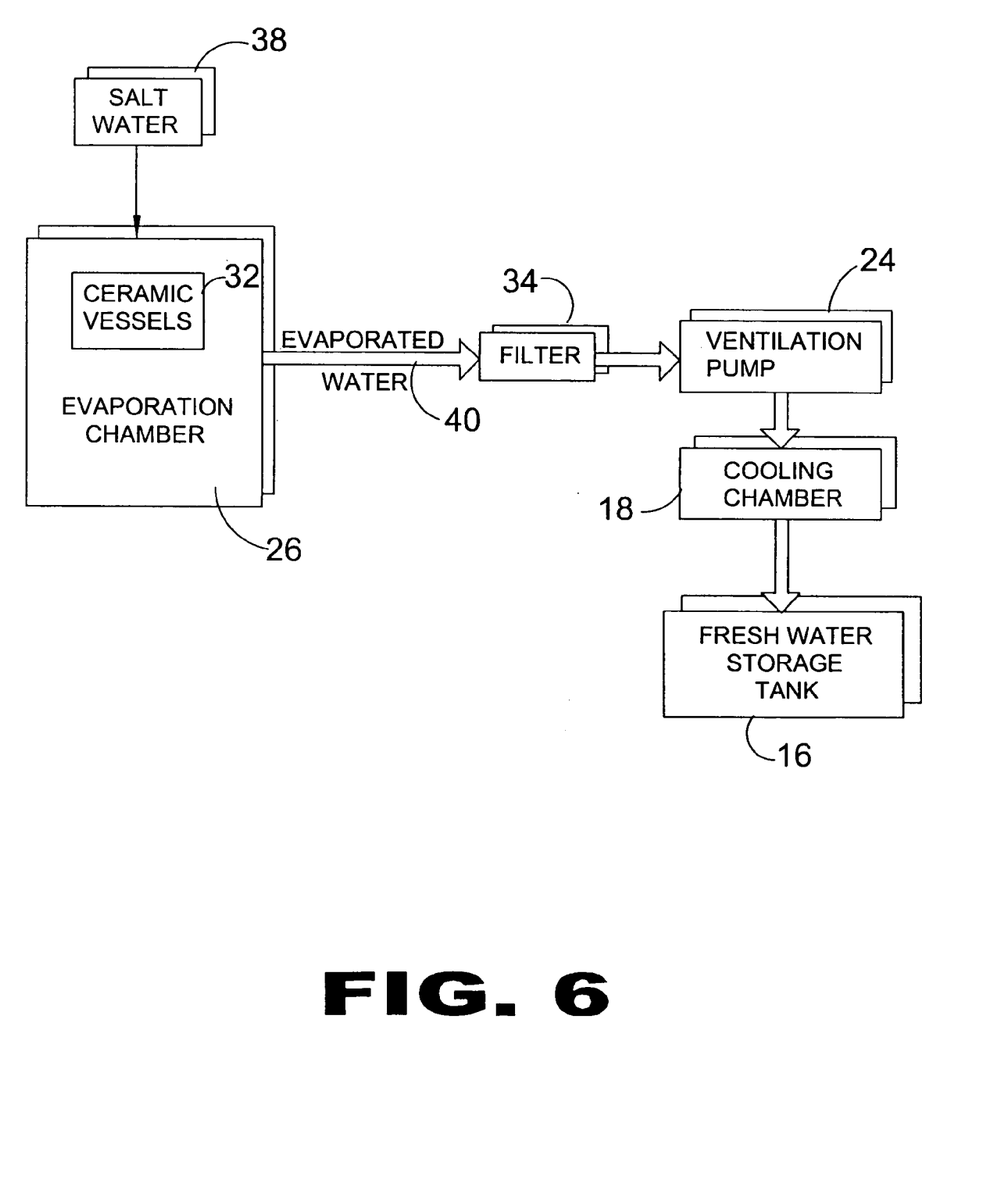
FIG. 6 is a block diagram of the desalination process of the present invention.

FIG. 6 is a block diagram of the desalination process 10 of the present invention. The desalination process 10 includes a supply of salt Water 38 or contaminated water. The salt water 38 is fed into the ceramic vessel 32 located in the evaporation chamber 28. The evaporation chamber 28 is heated to a temperature that causes the water portion of the salt water 38 to become evaporated water 40 while the salt portion crystallizes on the external surface of the ceramic vessel 32. The evaporated water 40 is passed through the filter 34 to remove dust and other gaseous byproducts of the evaporation process. From the filter 34, the evaporated water 40 pumped by the ventilation pump 24 into the condensation chamber 18. In the condensation chamber 18, the evaporated water 40 is cooled until it condenses and precipitates into fresh water 58. The fresh water 58 is removed from the condensation chamber 18 and stored in the fresh water storage tank 16 until needed.

Figure 7:
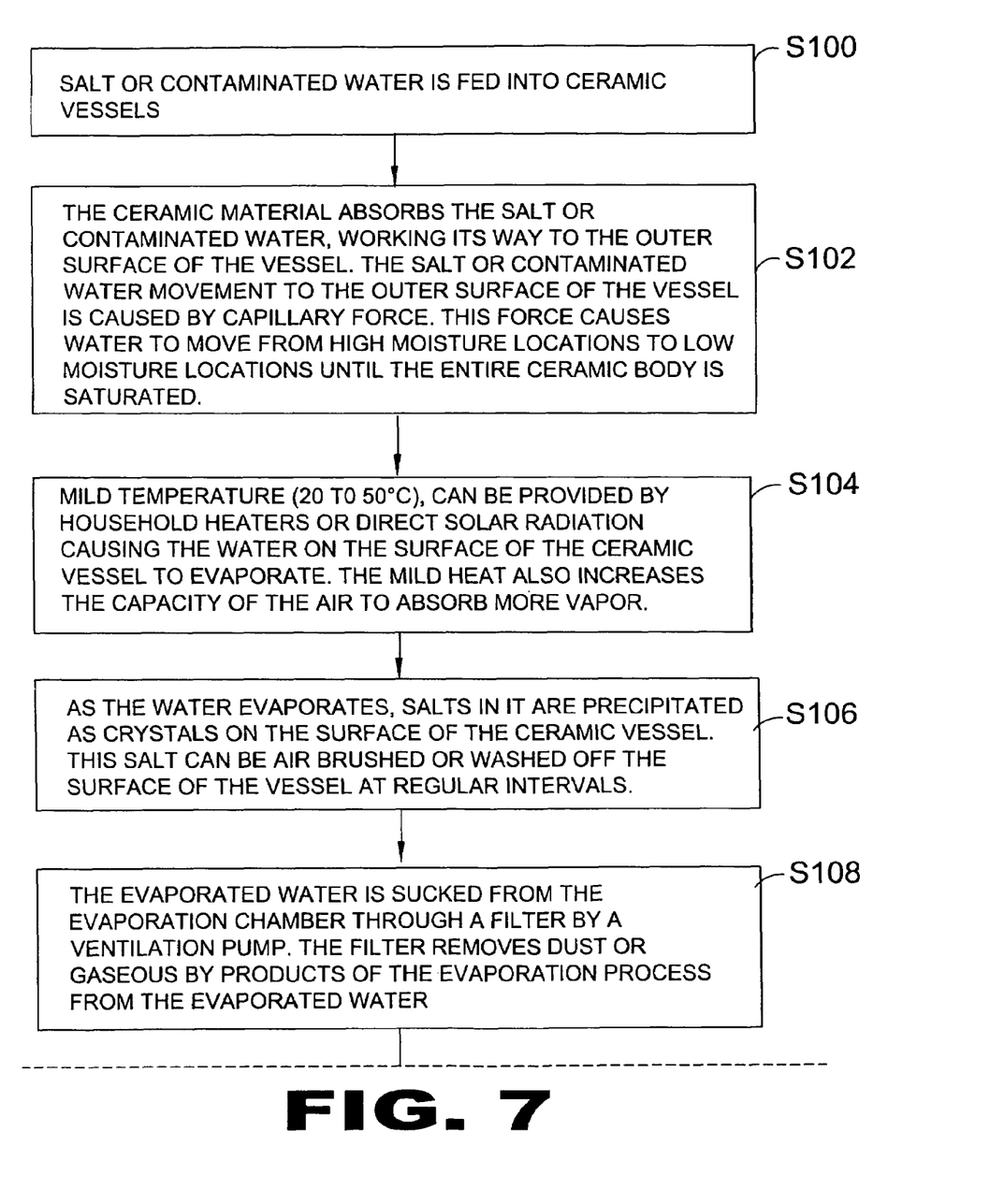
FIG. 7 is a flow diagram of the desalination process of the present invention.

FIG. 7 is a flow diagram of the desalination process 10 of the present invention. In step S100 salt or contaminated water is fed into ceramic vessels. In step S102, the ceramic material absorbs the salt or contaminated water, working its way to the outer surface of the vessel by capillary force. Capillary force causes the water to move from high moisture locations to low moisture locations until the entire ceramic body is saturated. Household heaters or direct solar radiation provides mild temperature (20 to 50° C.) to the vessel in step S104. The mild temperature causes the water on the surface of the ceramic vessel to evaporate. The mild temperature also increases the capacity of the air to absorb more vapor. In step S106, as the water evaporates, salts in the water are precipitated as crystals on the surface of the ceramic vessel. The salt can be air brushed or washed off the surface of the vessel at regular intervals. In step S108, the evaporated water is sucked from the evaporation chamber through a filter by a ventilation pump. The filter removes dust or gaseous byproducts of the evaporation process from the evaporated water.

Figure 8:
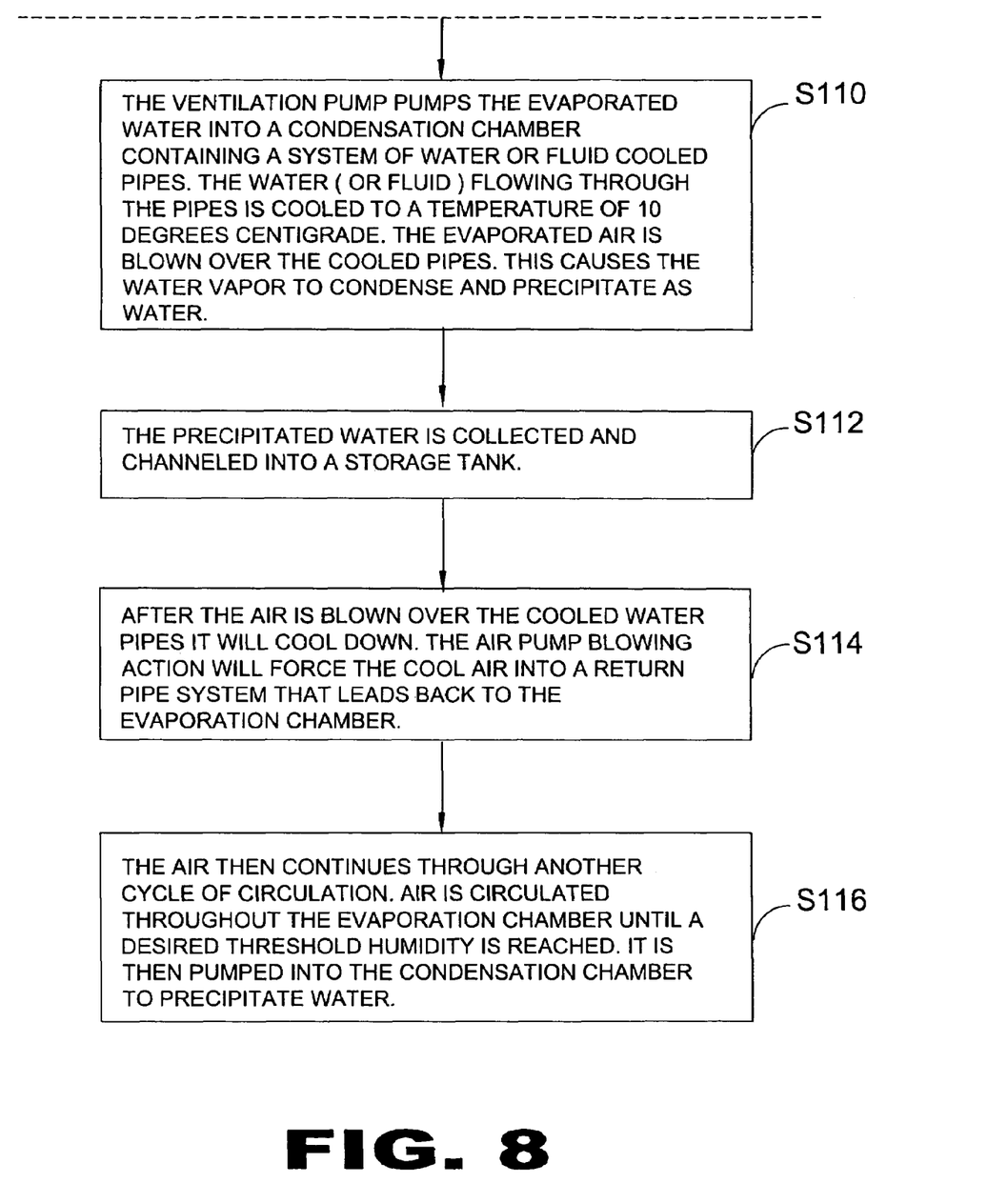
FIG. 8 is a continuation of the flow diagram of FIG. 7 of the desalination process of the present invention.

FIG. 8 is a continuation of the flow diagram shown in FIG. 7 of the desalination process 10 of the present invention. In step S110, the ventilation pump pumps the evaporated water into a condensation chamber containing a system of water or fluid cooled pipes. The water (or fluid) flowing through the pipes is cooled to a temperature of 10° C. The evaporated water is blown over the cooled pipes, causing the water vapor to condense and precipitate as water. The precipitated water is collected and channeled into a storage tank in step S112. In step S114, after the evaporated water is blown over the cooled water pipes it will cool down. The air pump blowing action will force the cooled air that has not condensed into a return pipe system that leads back to the evaporation chamber. In step S116, the air in the return pipe system then continues through another cycle of circulation. Air is circulated throughout the evaporation chamber until predetermined threshold humidity is reached. It is them pumped into the condensation chamber to precipitate water.

Figure 9:
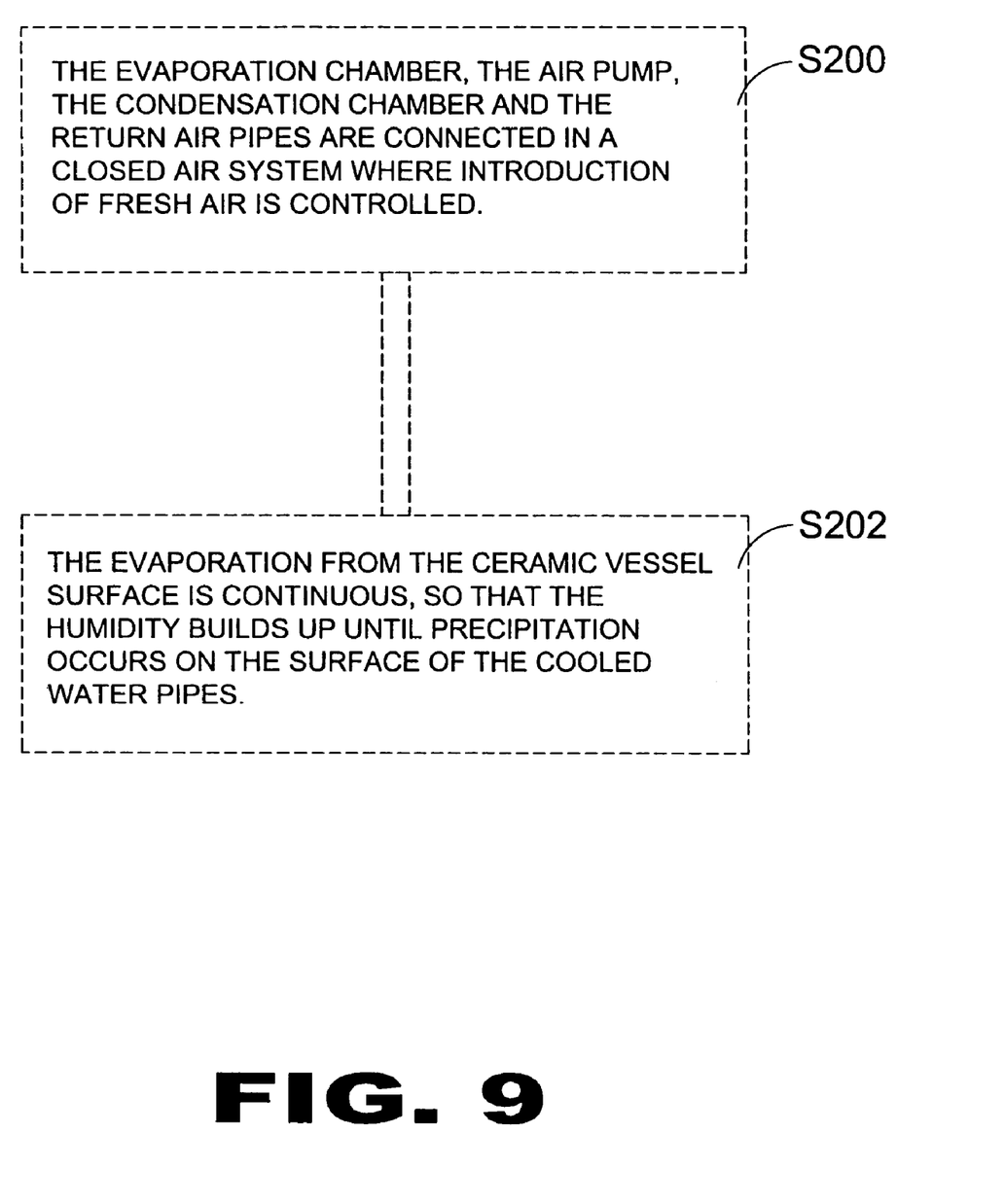
FIG. 9 is a logic diagram of the desalination process of the present invention.

FIG. 9 is a flow diagram of the desalination process 10 of the present invention. In step S200, the evaporation chamber, the air pump, the condensation chamber and the return air pipes are connected in a closed air system where introduction of fresh air is controlled. In step S202, the evaporation from the ceramic vessel surface is continuous, so that the humidity builds up until precipitation occurs on the surface of the cooled water pipes.

Figure 10:
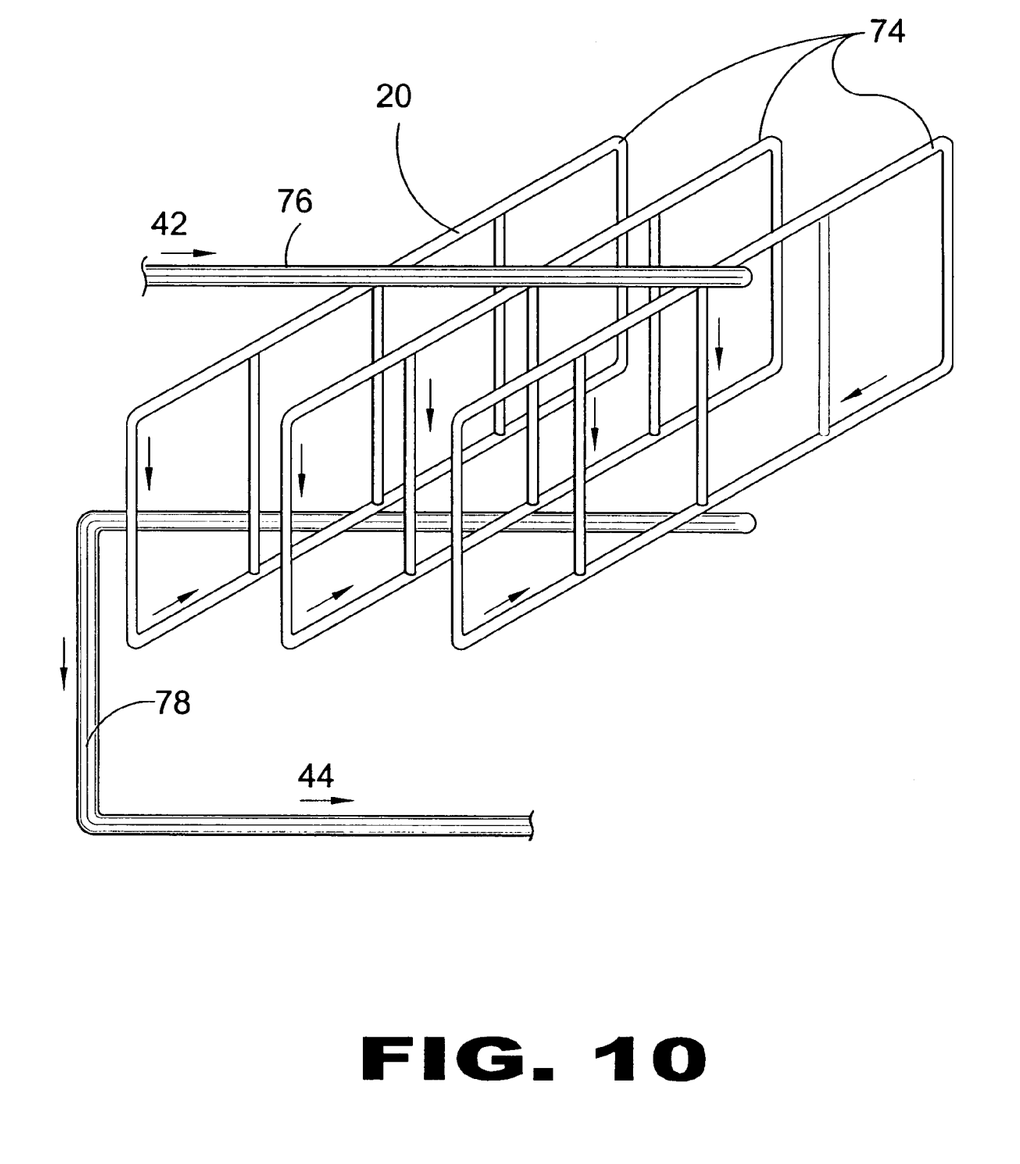
FIG. 10 is a perspective view of a tubing lattice condensation of the desalination process of the present invention.

FIG. 10 is a perspective view of the condensation surface pipes 20 of the desalination process 10 of the present invention. The condensation surface pipes 20 are located within the condensation chamber 18 shown in FIG. 2. Herein the condensation surface pipes 20 are made of copper. However, this is for purposes of example only, and any material that is a good conductor of hot and cold may be used. Shown herein is one possible configuration of the condensation surface pipes 20. However, this is for purposes of example only, and any number of configurations may be used. Herein, there are three condensation structures 74. Each condensation structure 74 is formed from the condensation surface pipes 20 in the shape of a rectangle. The condensation structure 74 also includes three condensation surface pipes 20 connecting the long parts of the rectangle. The condensation structures 74 rest between a cold water inflow pipe 76 and a cold water outflow pipe 78.

Water or liquid cooled to approximately 10° C. leaves the cold water tank 12 and flows through a cold water inflow pipe 76, as indicated by the inflow directional arrow 42. The water then circulates through the condensation structures 74, making them cold. The water then flows from the condensation structures 74 into a cold water outflow pipe 78, as indicated by the outflow directional arrow 44. The cold water outflow pipe 78 is attached to the cold water tank 12, where the water flows back into to be re-circulated.

It will be understood that each of the elements described above, or two or more together may also find a useful application in other types of devices differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A distillation system comprising:
   a. A source of water having at least one contaminant contained therein;
   b. An evaporation chamber for receiving said contaminated water, the evaporation chamber having a window for allowing solar energy to enter said chamber for heating an interior of said chamber;
   c. A vessel made of ceramic material or clay material within said evaporation chamber having an ability to absorb water;
   d. Perforated heat conducting tubing for distributing contaminated water throughout said vessel, walls of said vessel absorbing water which is evaporated from outer surfaces of said walls warmed by solar energy leaving behind solid contaminants on inner surfaces of said walls;
   e. A condensation chamber connected to said evaporation chamber for receiving evaporated water, condensing and thereby producing purified water in liquid form; and
   d. a storage device connected to said condensation chamber for storing said purified liquid water.

2. The system as recited in claim 1, having a ventilation pump to move evaporated water in said evaporation chamber to said condensation chamber.

3. The system as recited in claim 2, having a return duct to transfer non-condensed water in said condensation chamber to said evaporation chamber for recirculation.

4. The system as recited in claim 3, wherein said condensation chamber comprises a plurality of condensation pipes having a cooling liquid flowing therethrough.

5. The system as recited in claim 4, wherein said cooling liquid is at a temperature of substantially 10 degrees Celsius.

6. The system as recited in claim 5, wherein said evaporation chamber comprises a plurality of vessels for absorbing contaminated water.

7. The system as recited in claim 6, wherein said at least one contaminant is selected from the group consisting of salt, bacteria, a pathogen, silt and dirt.

8. A distillation process including the activities of:
   a. providing water containing at least one contaminant into an evaporation chamber, said evaporation chamber having a window for allowing solar energy to enter said chamber for heating an interior of said chamber, said evaporation chamber containing a vessel of ceramic or clay material having an ability to absorb water, and perforated heat conducting tubing for distributing contaminated water throughout said vessel;
b. absorbing the contaminated water within the evaporation chamber;
c. evaporating the absorbed contaminated water;
d. retaining, within said evaporation chamber, the at least one contaminant contained within the contaminated water;
e. providing the evaporated water to a condensation chamber connected to the evaporation chamber;
f. condensing and producing purified water in liquid form; and
g. storing the purified liquid water in a storage tank.

9. The process of claim 8, wherein providing the evaporated water to the condensing chamber includes the activity of acquiring the evaporated water from the evaporation chamber.

10. The process of claim 8, wherein condensing further comprises the activity of providing a liquid at a predetermined temperature through at least one pipe causing the evaporated water within the condensation chamber to be condensed into a liquid form.

11. A distillation system comprising:
a. a source of water having at least one contaminant contained therein;
b. an evaporation chamber for receiving said contaminated water, the evaporation chamber having a window for allowing solar energy to enter said chamber for heating an interior of said chamber;
c. a plurality of panels made of ceramic material or clay within said evaporation chamber having an ability to absorb water;
d. perforated heat conducting tubing passing through said panels distributing contaminated water within said panels, said panels absorbing water which is evaporated from outer surfaces of said panels warmed by solar energy;
e. a condensation chamber connected to said evaporation chamber for receiving evaporated water, condensing and thereby producing purified water in liquid form; and
d. a storage device connected to said condensation chamber for storing said purified liquid water.

12. The system of claim 11 in which said contaminated water is salt water and said system is a desalinization plant.

* * * * *